United States Patent
Iruya et al.

(10) Patent No.: US 9,711,257 B2
(45) Date of Patent: Jul. 18, 2017

(54) FLUORINATED ELASTOMER COMPOSITION AND METHOD FOR ITS PRODUCTION, MOLDED PRODUCT, CROSS-LINKED PRODUCT, AND COVERED ELECTRIC WIRE

(71) Applicant: Asahi Glass Company, Limited, Chiyoda-ku (JP)

(72) Inventors: Ken Iruya, Chiyoda-ku (JP); Satoko Yasuda, Chiyoda-ku (JP); Daisuke Taguchi, Chiyoda-ku (JP); Yasuhiko Matsuoka, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/070,459

(22) Filed: Mar. 15, 2016

(65) Prior Publication Data

US 2016/0196895 A1   Jul. 7, 2016

Related U.S. Application Data

(63) Continuation of application No. PCT/JP2014/073575, filed on Sep. 5, 2014.

(30) Foreign Application Priority Data

Sep. 25, 2013  (JP) ................ 2013-198249
Nov. 28, 2013  (JP) ................ 2013-246415

(51) Int. Cl.
| | | |
|---|---|---|
| H01B 3/44 | (2006.01) | |
| H01B 3/28 | (2006.01) | |
| B60R 16/02 | (2006.01) | |
| C08L 27/18 | (2006.01) | |
| H01B 7/00 | (2006.01) | |
| H01B 7/04 | (2006.01) | |
| H01B 7/295 | (2006.01) | |

(52) U.S. Cl.
CPC ......... *H01B 3/445* (2013.01); *B60R 16/0215* (2013.01); *C08L 27/18* (2013.01); *H01B 3/28* (2013.01); *H01B 3/441* (2013.01); *H01B 7/0045* (2013.01); *H01B 7/041* (2013.01); *H01B 7/295* (2013.01); *C08L 2205/025* (2013.01); *C08L 2205/03* (2013.01)

(58) Field of Classification Search
CPC ......... H01B 3/28; H01B 3/441; H01B 3/445; H01B 7/295; H01B 7/041; H01B 7/0045; B60R 16/0215; C08L 27/18; C08L 23/0884; C08L 2205/025; C08L 2205/03
See application file for complete search history.

(56) References Cited

U.S. PATENT DOCUMENTS 7,019,079 B2 *  3/2006  Sumi et al. ............. C08L 27/18
                                                           525/199

FOREIGN PATENT DOCUMENTS

| JP | 64-31853 | 2/1989 |
|---|---|---|
| JP | 5-78539 | 3/1993 |
| JP | 6-228397 | 8/1994 |
| JP | 7-97458 | 4/1995 |
| JP | 9-31285 | 2/1997 |
| JP | 10-334738 | 12/1998 |
| JP | 2000-30535 | 1/2000 |
| JP | 2010-186585 | 8/2010 |
| JP | 2013-62259 | 4/2013 |
| JP | 2013-170259 | 9/2013 |
| WO | WO 2013/146704 A1 | 10/2013 |

OTHER PUBLICATIONS

English Translation of International Search Report issued Nov. 4, 2014 in PCT/JP2014/073575, filed Sep. 5, 2014.

* cited by examiner

*Primary Examiner* — Nathan M Nutter
(74) *Attorney, Agent, or Firm* — Oblon, McClelland, Maier & Neustadt, L.L.P.

(57) ABSTRACT

To provide a fluorinated elastomer composition which is excellent in flexibility, heat resistance and flame retardance, and a molded product, cross-linked product and covered electric wire, using such a fluorinated elastomer composition.

A fluorinated elastomer composition comprising a tetrafluoroethylene/propylene copolymer (a), an ethylene/tetrafluoroethylene copolymer (b), an ethylene copolymer (c) containing epoxy groups and a flame retardant (d), wherein the mass ratio [(a)/(b)] of (a) to (b) is from 70/30 to 40/60, the mass ratio [(b)/(c)] of (b) to (c) is from 100/0.1 to 100/10, and the content of (d) is from 0.1 to 30 parts by mass per 100 parts by mass of the total content of (a), (b) and (c).

10 Claims, No Drawings

FLUORINATED ELASTOMER COMPOSITION AND METHOD FOR ITS PRODUCTION, MOLDED PRODUCT, CROSS-LINKED PRODUCT, AND COVERED ELECTRIC WIRE

TECHNICAL FIELD

The present invention relates to a fluorinated elastomer composition and a method for its production, a molded product, a cross-linked product, and a covered electric wire.

BACKGROUND ART

A tetrafluoroethylene/propylene copolymer (hereinafter sometimes referred to as a "TFE/P copolymer") is used for hoses, tubes, gaskets, packing, diaphragms, sheets, electric wire covering materials, etc., as an elastomer material which is excellent in properties such as heat resistance, oil resistance, chemical resistance, electrical insulation properties, flexibility, etc. and which is radiation cross-linkable.

Further, in order to supplement the properties of a TFE/P copolymer, it has been proposed to blend an ethylene/tetrafluoroethylene copolymer (hereinafter sometimes referred to as "ETFE") to the TFE/P copolymer.

For example, in Patent Document 1, it is attempted to improve mechanical properties such as tensile strength and tear strength, or properties such as toughness, etc. by blending ETFE to a TFE/P copolymer. And, in Patent Document 1, for the purpose of lowering the compound price, a large amount of an ethylene/acrylate copolymer or an ethylene/vinyl acetate copolymer is further blended in addition to the TFE/P copolymer and ETFE.

In Patent Document 2, in order to improve the cut-through properties (properties less susceptible to thermal softening at high temperatures) of a TFE/P copolymer, ETFE is blended together with calcium carbonate.

Also in Patent Document 3, in order to improve the cut-through resistance, ETFE is blended. Patent Document 3 discloses that if the ETFE to be blended to a TFE/P copolymer is too much, the flexibility and elongation tend to decrease, and therefore, the blend ratio of ETFE to the entire blend polymer should be at most 40 mass %.

Further, for applications for which a high level of flame retardance is required, a flame retardant is incorporated in a TFE/P copolymer.

For example, in the above Patent Document 3, from 0.5 to 20 parts by mass of antimony trioxide as a flame retardant is incorporated per 100 parts by mass of the blend polymer.

PRIOR ART DOCUMENTS

Patent Documents

Patent Document 1: JP-A-5-78539
Patent Document 2: JP-A-10-334738
Patent Document 3: JP-A-2010-186585

DISCLOSURE OF INVENTION

Technical Problem

Particularly for an elastomer material to be used for a harness of an engine room of an automobile, excellent flexibility is required in order to secure a degree of freedom for wiring of the harness. In order to secure flexibility while preventing lowering of flexibility and elongation, as pointed out in Patent Document 3, it was necessary to lower the proportion of ETFE to be blended to a TFE/P copolymer. However, if the proportion of ETFE to be blended to a TFE/P copolymer was lowered, there was a case where oil resistance to lubricant oil such as automatic transmission oil was inadequate, and it has been desired to achieve an adequate flexibility regardless of the amount of ETFE.

Further, in a case where a flame retardant is incorporated in a blend polymer as disclosed in Patent Document 3, the flexibility or the heat resistance may significantly be impaired depending upon the flame retardant.

The present invention has been made under these circumstances and has an object to provide a fluorinated elastomer composition which is excellent in flexibility, heat resistance and flame retardance, and a method for its production. Further, it also has an object to provide a molded product, cross-linked product and covered electric wire, using such a fluorinated elastomer composition.

Solution to Problem

The present inventors have inspected a fluorinated elastomer composition consisting solely of a TFE/P copolymer and ETFE, have paid attention to the fact that the compatibility of the TFE/P copolymer and ETFE is inadequate, and have further proceeded with the study and have found that the compatibility is improved and properties such as flexibility are improved by blending an ethylene copolymer containing epoxy groups in a specific proportion. Further, they have found that excellent flame retardance can be imparted while the above properties are sufficiently maintained by blending a flame retardant in a specific ratio with the composition.

The present invention has been accomplished on the basis of such a discovery, and provides a fluorinated elastomer composition, a method for its production, a molded product, a cross-linked product and a covered electric wire having the following constructions [1] to [9].

[1] A fluorinated elastomer composition comprising a TFE/P copolymer (a), an ETFE copolymer (b), an ethylene copolymer (c) containing epoxy groups and a flame retardant (d), wherein the mass ratio [(a)/(b)] of the tetrafluoroethylene/propylene copolymer (a) to the ETFE copolymer (b) is from 70/30 to 40/60, the mass ratio [(b)/(c)] of the ETFE copolymer (b) to the ethylene copolymer (c) containing epoxy groups is from 100/0.1 to 100/10, and the content of the flame retardant (d) is from 0.1 to 30 parts by mass per 100 parts by mass of the total content of the TFE/P copolymer (a), the ETFE copolymer (b) and the ethylene copolymer (c) containing epoxy groups.

[2] The fluorinated elastomer composition according to the above [1], wherein the flame retardant (d) is at least one member selected from the group consisting of antimony trioxide, a phosphoric acid ester and polytetrafluoroethylene.

[3] The fluorinated elastomer composition according to the above [1] or [2], wherein the TFE/P copolymer (a) is a copolymer comprising from 35 to 70 mol % of units derived from tetrafluoroethylene, from 25 to 55 mol % of units derived from propylene, and from 0 to 40 mol % of units derived from other monomer, and the ETFE copolymer (b) is a copolymer comprising from 45 to 70 mol % of units derived from tetrafluoroethylene, from 30 to 55 mol % of units derived from ethylene, and from 0 to 10 mol % of units derived from other monomer.

[4] The fluorinated elastomer composition according to any one of the above [1] to [3], wherein the ethylene copolymer (c) containing epoxy groups is at least one member selected from the group consisting of an ethylene/glycidyl methacrylate copolymer, an ethylene/glycidyl methacrylate/vinyl acetate copolymer, an ethylene/methyl acrylate/glycidyl methacrylate copolymer and an ethylene/ethyl acrylate/glycidyl methacrylate copolymer.

[5] The fluorinated elastomer composition according to any one of the above [1] to [4], which has a melt flow rate of from 4 to 50 g/10 min. as measured at a temperature of 297° C. under a load of 49N.

[6] A method for producing the fluorinated elastomer composition as defined in any one of the above [1] to [5], which comprises a step of kneading the TFE/P copolymer (a), the ETFE copolymer (b), the ethylene copolymer (c) containing epoxy groups and the flame retardant (d) under a heating condition of from 250 to 320° C.

[7] A molded product obtained by molding the fluorinated elastomer composition as defined in any one of the above [1] to [5].

[8] A cross-linked product obtained by cross-linking the fluorinated elastomer composition as defined in any one of the above [1] to [5].

[9] A covered electric wire comprising a conductor and a covering material for covering the conductor, wherein the covering material is the fluorinated elastomer composition as defined in any one of the above [1] to [5].

[10] A covered electric wire comprising a conductor and a covering material for covering the conductor, wherein the covering material is the cross-linked product as defined in the above [8].

Advantageous Effects of Invention

The fluorinated elastomer composition of the present invention is excellent in flexibility, heat resistance and flame retardance.

Further, the molded product, cross-linked product or covered electric wire of the present invention is excellent in flexibility, heat resistance and flame retardance.

DESCRIPTION OF EMBODIMENTS

Fluorinated Elastomer Composition

The fluorinated elastomer composition of the present invention (hereinafter sometimes referred to as "the composition of the present invention") comprises a TFE/P copolymer (a), ETFE (b), an ethylene copolymer (c) containing epoxy groups and a flame retardant (d).

Here, in the following description, a molar ratio of units constituting each component is a molar ratio measured by means of $^{13}$C-NMR, FT-IR or fluorine content analysis method.

"Units derived from other monomer" mean units derived from a monomer other than the monomers forming units essential as the units constituting the polymer (such as tetrafluoroethylene and propylene in the TFE/P copolymer, or ethylene and tetrafluoroethylene in ETFE).

(TFE/P Copolymer (a))

The TFE/P copolymer (a) (hereinafter sometimes referred to as the "component (a)") is an elastic copolymer comprising units derived from tetrafluoroethylene (hereinafter sometimes referred to as "TFE") and units derived from propylene (hereinafter sometimes referred to as "P"). The component (a) may further contains units derived from other monomer.

The component (a) is preferably a copolymer comprising from 35 to 70 mol % of units derived from TFE, from 25 to 55 mol % of units derived from P, and from 0 to 40 mol % of units derived from other monomer. Here, from 0 to 40 mol % of units derived from other monomer means that no units derived from other monomer are contained, or if contained, their proportion is from 0.01 to 40 mol %.

The proportion of units derived from TFE in all units constituting the component (a) is more preferably from 40 to 70 mol %, further preferably from 50 to 65 mol %, particularly preferably from 52 to 60 mol %. When the proportion of units derived from TFE is at least 35 mol %, the composition of the present invention is excellent in flexibility and is excellent also in mechanical properties and chemical resistance. Further, when the proportion of units derived from TFE is at most 70 mol %, it may have units derived from P in a sufficient proportion.

The proportion of units derived from P in all units constituting the component (a) is more preferably from 30 to 55 mol %, further preferably from 35 to 50 mol %, particularly preferably from 40 to 48 mol %. When the proportion of units derived from P is at least 25 mol %, the composition of the present invention is excellent in flexibility and is excellent also in molding processability. Further, when the proportion of units derived from P is at most 55 mol %, it may have units derived from TFE in a sufficient proportion.

The proportion of units derived from other monomer in all units constituting the component (a) is more preferably from 0 to 20 mol %, further preferably from 0 to 15 mol %, particularly preferably from 0 to 10 mol %. Here, from 0 to 20 mol % of units derived from other monomer means, as described above, that no units derived from other monomer are contained, or if contained, their proportion is from 0.01 to 20 mol %. The same applies hereinafter. In a case where units derived from other monomer acre contained, the lower limit value for their proportion is preferably 0.1 mol %, more preferably 0.5 mol %. When the proportion of units derived from other monomer is at most 40 mol %, the composition of the present invention may have units derived from TFE and P in sufficient proportions.

Other monomer may, for example, be a fluorinated monomer other than TFE, a hydrocarbon monomer other than P, a cross-linkable monomer, etc.

The fluorinated monomer other than TFE may, for example, be chlorotrifluoroethylene, vinylidene fluoride, hexafluoropropylene, a perfluoro(alkyl vinyl ether), a perfluoro(alkyloxyalkyl vinyl ether), etc. As the fluorinated monomer, one type may be used alone, or two or more types may be used in combination.

When the component (a) contains units derived from a fluorinated monomer other than TFE, it is possible to improve e.g. the low temperature flexibility of the composition of the present invention.

The number of carbon atoms in the perfluoroalkyl group in the perfluoro(alkyl vinyl ether) is preferably from 1 to 6, more preferably from 1 to 4. As a specific example of the perfluoroalkyl group, a $CF_3$ group, a $C_2F_5$ group or a $C_3F_7$ group is preferred.

The number of carbon atoms in the perfluoro(alkyloxyalkyl) group in the perfluoro(alkyloxyalkyl vinyl ether) is preferably from 2 to 9, more preferably from 2 to 6.

The number of etheric oxygen atoms in the perfluoro(alkyloxyalkyl) group is preferably at most 4, more preferably at most 2. As a specific example of the perfluoro (alkyloxyalkyl) group, a $CF_3OCF(CF_3)CF_2$— group, a $C_2F_5OC_2F_4$— group, a $C_3F_7OC_3F_6$— group or a $C_3F_7OC_3F_6OC_3F_6$— group is preferred.

Specific examples of the perfluoro(alkyl vinyl ether) and the perfluoro(alkyloxyalkyl vinyl ether) include $CF_2$=$CFOCF_3$, $CF_2$=$CFOCF_2CF_3$, $CF_2$=$CFOCF_2CF_2CF_3$, $CF_2$=$CFO(CF_2)_3CF_3$, $CF_2$=$CFO(CF_2)_4CF_3$, $CF_2$=$CFOCF_2OCF_3$, $CF_2$=$CFOCF_2CF_2OCF_3$, $CF_2$=$CFOCF_2CF_2OCF_2CF_3$, $CF_2$=$CFO(CF_2)_3OCF_2CF_3$, $CF_2$=$CFOCF_2CF(CF_3)OCF_3$, $CF_2$=$CFOCF_2CF(CF_3)O(CF_2)_2CF_3$, $CF_2$=$CFO(CF_2CF_2O)_2CF_2CF_3$, $CF_2$=$CFO[CF_2CF(CF_3)O]_2CF_3$, $CF_2$=$CFO[CF_2CF(CF_3)O]_2(CF_2)_2CF_3$, etc.

The hydrocarbon monomer other than P may, for example, be a vinyl ether such as methyl vinyl ether, ethyl vinyl ether, butyl vinyl ether, tert-butyl vinyl ether, methoxyethyl vinyl ether or ethoxyethyl vinyl ether; a vinyl ester such as vinyl acetate, vinyl benzoate or vinyl nonanoate; or an α-olefin (excluding P) such as ethylene, butene or isobutene. As the hydrocarbon monomer, one type may be used alone, or two or more types may be used in combination.

When the component (a) contains units derived from a hydrocarbon monomer other than P, it is possible to improve e.g. the molding processability of the composition of the present invention.

In a case where as other monomer, a fluorinated monomer, a hydrocarbon monomer or their mixture is employed, the content of units derived from other monomer in the number of moles of the total of units derived from TFE and P is preferably from 0.01 to 20 mol %, more preferably from 0.1 to 15 mol %, particularly preferably from 0.3 to 10 mol %.

The cross-linkable monomer is meant for a monomer having at least one cross-linkable group in the same molecule. The cross-linkable group in the cross-linkable monomer may, for example, be a carbon-carbon double bond, a halogen atom or the like.

The cross-linkable monomer includes, for example, 1-bromo-1,1,2,2-tetrafluoroethyl trifluorovinyl ether, 1-iodo-1,1,2,2-tetrafluoroethyl trifluorovinyl ether, vinyl crotonate, vinyl methacrylate, etc. As the cross-linkable monomer, one type may be used alone, or two or more types may be used in combination.

The content of units derived from a cross-linkable monomer is preferably from 0.001 to 8 mol %, more preferably from 0.001 to 5 mol %, particularly preferably from 0.01 to 3 mol %, in all units constituting the component (a).

By incorporating the units derived from a cross-linkable monomer, it is possible to improve e.g. the mechanical properties or compression set of the composition of the present invention.

The Mooney viscosity ($ML_{1+10}$, 121° C.) of the component (a) is preferably from 20 to 200, more preferably from 30 to 150, most preferably from 40 to 120. The Mooney viscosity is an index for the molecular weight and is measured in accordance with JIS K6300-1:2000. The larger the value, the larger the molecular weight, and the smaller the value, the smaller the molecular weight. When the Mooney viscosity is within a range of from 20 to 200, the composition of the present invention is excellent in mechanical properties and moldability.

As an example of a commercial product of the component (a), "AFLAS150CS" manufactured by Asahi Glass Company, Limited, may be mentioned.

(ETFE (b))

ETFE (b) (hereinafter sometimes referred to as the "component (b)") is a copolymer comprising units derived from TFE and units derived from ethylene (hereinafter sometimes referred to as "E"), and is typically a copolymer comprising from 20 to 80 mol % of units derived from TFE, from 20 to 80 mol % of units derived from E and from 0 to 10 mol % of units derived from a monomer other than TFE and E.

The component (b) is a resin excellent in heat resistance, oil resistance, electrical insulating properties, chemical resistance, water resistance, radiation resistance, etc.

The proportion of units derived from TFE in all units constituting the component (b) is preferably from 30 to 80 mol %, more preferably from 40 to 70 mol %, further preferably from 45 to 70 mol %, particularly preferably from 50 to 65 mol %. When the proportion of units derived from TFE is at least 30 mol %, the composition of the present invention is excellent in oil resistance. Further, when the proportion of units derived from TFE is at most 80 mol %, the component (b) may have units derived from E in a sufficient proportion.

The proportion of units derived from E in all units constituting the component (b) is preferably from 20 to 70 mol %, more preferably from 30 to 60 mol %, further preferably from 30 to 55 mol %, particularly preferably from 35 to 50 mol %. When the proportion of units derived from E is at least 20 mol %, the component (b) has a sufficiently high melting point and is excellent in heat resistance. Further, when the proportion of units derived from E is at most 70 mol %, the component (b) may have units derived from TFE in a sufficient proportion.

The proportion of units derived from other monomer in all units constituting the component (b) is from 0 to 10 mol %, preferably from 0.01 to 7 mol %, more preferably from 0.1 to 5 mol %. When the proportion of units derived from other monomer is at most 10 mol %, the component (b) may have units derived from TFE and units derived from E in sufficient proportions. Further, when the proportion of units derived from other monomer is at least the preferred lower limit value, it is possible to improve the properties such as stress crack resistance, processability, etc. of the composition of the present invention.

From the above viewpoint, the component (b) is preferably a copolymer comprising from 45 to 70 mol % of units derived from TFE, from 30 to 55 mol % of units derived from E and from 0 to 10 mol % of units derived from other monomer, more preferably a copolymer comprising from 40 to 70 mol % of units derived from TFE, from 30 to 60 mol % of units derived from E and from 0 to 10 mol % of units derived from other monomer, particularly preferably a copolymer comprising from 45 to 70 mol % of units derived from TFE, from 30 to 55 mol % of units derived from E and from 0.1 to 5 mol % of units derived from other monomer.

Here, in the above description, from 0 to 10 mol % of units derived from other monomer means that no units derived from other monomer are contained, or if contained, their proportion is from 0.01 to 10 mol %.

Other monomer may, for example, be a fluorinated olefin other than TFE, a fluoro vinyl ether, a hydrocarbon monomer, a vinyl ether containing no fluorine, a monomer containing a carbonyl group, etc.

The fluorinated olefin other than TFE may, for example, be a fluorinated ethylene (excluding TFE) such as vinylidene fluoride or trifluorochloroethylene; or a fluorinated propylene such as $CF_2$=$CFCF_3$, $CF_2$=$CHCF_3$ or $CH_2$=$CHCF_3$.

By incorporating units derived from a fluorinated olefin other than TFE, it is possible to improve the stress crack resistance or mechanical properties of the composition of the present invention.

Other monomer may, for example, be a monomer represented by the following formula (1) (hereinafter referred to as a "monomer (1)"), a monomer represented by the following monomer (2), or a fluorovinyl ether having a group which can be easily converted to a carboxylic acid group or a sulfonic acid group.

By incorporating units derived from a fluorovinyl ether, it is possible to improve the stress crack resistance of the composition of the present invention.

$$CH_2=CR^1-(CF_2)_aR^2 \tag{1}$$

$$Rf(OCFR^3CF_2)_bOCF=CF_2 \tag{2}$$

Here, in the formula (1), each of $R^1$ and $R^2$ which are independent of each other, is a hydrogen atom or a fluorine atom, and a is an integer of from 1 to 12, and in the formula (2), Rf is a $C_{1-6}$ perfluoroalkyl group, $R^3$ is a fluorine atom or a trifluoromethyl group, and b is an integer of from 0 to 5.

The monomer (1) may, for example, be $CF_3CF_2CH=CH_2$, $CF_3CF_2CF_2CH=CH_2$, $CF_3CF_2CF_2CF_2CF_2CH=CH_2$, $CF_3CF_2CF_2CF_2CH=CH_2$, $CF_2HCF_2CF_2CF=CH_2$, etc.

The monomer (2) may, for example, be $CF_3CF_2OCF_2CF_2OCF=CF_2$, $C_3F_7OCF(CF_3)$ $CF_2OCF=CF_2$, etc.

The fluorovinyl ether having a group which can be easily converted to a carboxylic acid group or a sulfonic acid group, may, for example, be $CH_3OC(=O)$ $CF_2CF_2CF_2OCF=CF_2$ or $FSO_2CF_2CF_2OCF(CF_3)$ $CF_2OCF=CF_2$.

The hydrocarbon monomer may, for example, be a $C_{3-4}$ α-olefin such as P, butene or isobutene, 4-methyl-1-pentene, cyclohexene, etc.

By incorporating units derived from a hydrocarbon monomer, it is possible to improve the processability, etc. of the composition of the present invention.

The vinyl ether containing no fluorine may, for example, be a vinyl ester such as vinyl acetate, vinyl lactate, vinyl butyrate or vinyl pivalate; methyl vinyl ether, ethyl vinyl ether, isobutyl vinyl ether, tert-butyl vinyl ether, cyclohexyl vinyl ether, hydroxybutyl vinyl ether, etc.

By incorporating units derived from a vinyl ether containing no fluorine, it is possible to improve the flexibility of the composition of the present invention.

The monomer containing a carbonyl group may, for example, be itaconic acid, itaconic anhydride, 5-norbornene-2,3-dicarboxylic acid, 5-norbornene-2,3-dicarboxylic anhydride, citraconic acid, citraconic anhydride, maleic acid, maleic anhydride, etc.

By incorporating units derived from a monomer containing a carbonyl group, it is possible to improve the adhesion, etc. of the composition of the present invention.

As other monomer, preferred is a monomer (1) since it is thereby possible to improve the mechanical strength of the composition of the present invention, more preferred is a monomer of the formula (1) wherein $R^1$ is a hydrogen atom and $R^2$ is a fluorine atom, particularly preferred is $CF_3CF_2CF_2CF_2CH=CH_2$ or $CF_3CF_2CF_2CF_2CF_2CF_2CH=CH_2$.

The molecular weight of the component (b) is not particularly limited, and a wide range of products i.e. from a low molecular weight product in the form of a wax at 40° C. or less to a melt-moldable high molecular weight product, are useful.

The melt flow rate (hereinafter referred to as "MFR") or the component (b) is preferably from 0.01 to 50,000 g/10 min., more preferably from 0.1 to 2,000 g/10 min., further preferably from 0.3 to 100 g/10 min. MFR is an index for the molecular weight. When the MFR is at least the above lower limit value of the above range, molding processability, equal to a fluorinated resin, by hot-melting of the composition of the present invention becomes feasible from the viewpoint of equipment. When the MFR is at most the above upper limit value of the above range, the molded product will have a strength sufficient for practical use.

Here, MFR in this specification is a value measured at a temperature of 297° C. under a load of 49 N. Specifically, it is a mass (g/10 min.) of a resin flowing out in 10 minutes from a nozzle having a diameter of 2 mm and a length of 8 mm under a load of 49 N at 297° C., as measured by a Koka-type flow tester.

(Ethylene Copolymer (c) Containing Epoxy Groups)

The ethylene copolymer (c) containing epoxy groups (hereinafter sometimes referred to as the "component (c)") is considered to have an effect to improve the compatibility between the component (a) and the component (b).

The component (c) may be an ethylene copolymer such as a copolymer comprising units derived from E and units derived from a monomer having an epoxy group, or a copolymer comprising units derived from E, units derived from a monomer having an epoxy group and units derived from other monomer. As the component (c), one type may be used alone, or two or more types may be used in combination.

The monomer having an epoxy group may, for example, be an unsaturated glycidyl ether (such as allyl glycidyl ether, 2-methylallyl glycidyl ether or vinyl glycidyl ether), or an unsaturated glycidyl ester (such as glycidyl acrylate or glycidyl methacrylate). Among them, glycidyl methacrylate is preferred, since it is thereby possible to obtain a component (c) which further improves the compatibility between the component (a) and the component (b). As the monomer having an epoxy group, one type may be used alone, or two or more types may be used in combination.

Other monomer may, for example, be an acrylic acid ester (such as methyl acrylate or ethyl acrylate), a methacrylic acid ester (such as methyl methacrylate or ethyl methacrylate), a fatty acid vinyl ester such as vinyl acetate, an α-olefin other than E, etc. Among them, an ethylene unsaturated ester, i.e. an acrylic acid ester, a methacrylic acid ester or a fatty acid vinyl ester is preferred. When such a monomer is used as other monomer, it is possible to obtain a component (c) which further improves the compatibility between the component (a) and the component (b). As such other monomer, one type may be used alone, or two or more types may be used in combination.

The component (c) is preferably a copolymer having units derived from E and units derived from glycidyl methacrylate. When such a copolymer is used, the obtainable fluorinated elastomer composition will be further excellent in properties such as flexibility, oil resistance, moldability, etc.

As an example of such a copolymer, an ethylene/glycidyl methacrylate copolymer may be mentioned.

Further, a copolymer comprising units derived from E, units derived from glycidyl methacrylate and units derived from an ethylene unsaturated ester, is also preferred from the viewpoint of moldability and mechanical properties. As a specific example of such a copolymer, an ethylene/glycidyl methacrylate/vinyl acetate copolymer, an ethylene/methyl acrylate/glycidyl methacrylate copolymer or an ethylene/ethyl acrylate/glycidyl methacrylate copolymer may be mentioned. Among them, an ethylene/methyl acrylate/glycidyl methacrylate copolymer or an ethylene/ethyl acrylate/glycidyl methacrylate copolymer is preferred.

The content of units derived from E in all units constituting the component (c) is preferably from 55 to 99.9 mol %, more preferably from 70 to 94 mol %. When the content of units derived from E is at least 55 mol %, the composition of the present invention will be excellent in heat resistance and toughness.

The content of units derived from the monomer containing an epoxy group in all units constituting the component (c) is preferably from 0.1 to 15 mol %, more preferably from 1 to 10 mol %. When the content of units derived from the monomer containing an epoxy group is at least 0.1 mol %, the composition of the present invention will be excellent in moldability and mechanical properties.

In a case where the component (c) has units derived from other monomer, the content of units derived from such other monomer in all units constituting the component (c) is preferably from 1 to 30 mol %, more preferably from 10 to 30 mol %.

When the component (c) is used wherein the contents of the respective units are within the above ranges, it is possible to further improve the compatibility between the component (a) and the component (b). As a result, the obtainable fluorinated elastomer composition will be further excellent in properties such as flexibility, oil resistance, moldability, etc.

As a commercial product of the component (c), "Bond Fast E (trade name, manufactured by Sumitomo Chemical Co., Ltd.)" which is an ethylene/glycidyl methacrylate or "Bond Fast 7M (trade name, manufactured by Sumitomo Chemical Co., Ltd.)" which is an ethylene/methyl acrylate/glycidyl methacrylate copolymer, may, for example, be mentioned.

(Blend Ratios)

In the composition of the present invention, the mass ratio [(a)/(b)] of the component (a) to the component (b) is from 70/30 to 40/60, preferably from 65/35 to 45/55, more preferably from 55/45 to 45/55.

When the blend ratio of the component (a) is at least the lower limit value of the above range, excellent flexibility is obtainable. On the other hand, when the blend ratio of the component (b) is at least the lower limit value of the above range, excellent oil resistance is obtainable.

In the composition of the present invention, the mass ratio [(b)/(c)] of the component (b) to the component (c) is from 100/0.1 to 100/10, preferably from 100/0.3 to 100/7, more preferably from 100/0.5 to 100/5.

If the blend ratio of the component (c) is less than the lower limit value of the above range, the fluorinated elastomer composition is likely to have a problem of dispersion failure. This is considered to be such that the compatibility between the component (a) and the component (b) tends to be thereby low.

If the blend ratio of the component (c) exceeds the upper limit value of the above range, the oil resistance tends to be low, and at the same time, the heat resistance tends to be inadequate.

When the entire composition of the present invention is taken as 100 mass %, the total content of the components (a) to (c) i.e. [((a)+(b)+(c))/fluorinated elastomer composition] is preferably at least 30 mass %, more preferably at least 50 mass %. Further, it is usually preferably at most 99.9 mass %.

(Flame Retardant (d))

The component (d) is not particularly limited, and a known flame retardant may be used.

As the component (d), for example, a conventional flame retardant such as aluminum hydroxide, magnesium hydroxide, magnesium carbonate, antimony trioxide, sodium antimonite, antimony pentoxide, a phosphazene compound, a phosphoric acid ester, ammonium polyphosphate, melamine-melam-melem salt of a polyphosphoric acid, red phosphorus, a molybdenum compound or a boric acid compound may be mentioned.

As the phosphazene compound, for example, cyclophosphazene, polyphosphazene, cyclophenoxyphosphazene, or cyanophenoxyphosphazene may be mentioned.

As the phosphoric acid ester, for example, triphenyl phosphate, tricresyl phosphate, trixylenyl phosphate, cresyl phenyl phosphate, 2-ethylhexyl diphenyl phosphate or another aromatic phosphoric acid ester may be mentioned.

As the molybdenum compound, for example, ammonium molybdate, sodium molybdate or molybdenum trioxide may be mentioned.

As the boric acid compound, for example, sodium borate, borax or sodium octaborate may be mentioned.

Among them, in view of dispersibility and flame retardant effect, preferred is antimony trioxide or a phosphoric acid ester.

In the present invention, the component (d) is not limited to the above conventional flame retardant, and may be a conventional anti-dripping agent. An anti-dripping agent is an additive which has a function to suppress dripping at the time of burning.

As the anti-dripping agent, a known agent may be used. Particularly preferred is one forming a fibril structure in the resin in view of a high dripping suppressing effect.

As a dripping agent forming a fibril structure in the resin, polytetrafluoroethylene (PTFE) is preferred. Among PTFEs, one which is excellent in the dispersibility, a fine powder produced by emulsion polymerization, such as a dispersion having PTFE emulsified and dispersed in e.g. water is preferred.

The average particle size of PTFE is not particularly limited, and is preferably at most 700 μm, particularly preferably at most 600 μm. On the other hand, it is usually preferably at least 5 μm. The average particle size of PTFE is an average particle size measured by ASTM D1457.

The molecular weight of PTFE is at least 500,000 with a view to suppressing dripping at the time of burning, preferably from about 1,000,000 to about 50,000,000.

A silicone resin may be added together with PTFE. When they are used in combination, dripping can further be suppressed and the burning time can be shortened as compared with a case where only PTFE is added.

As such a component (d), one type may be used alone, or two or more types may be used in combination.

The component (d) is preferably at least one member selected from the group consisting of antimony trioxide, a phosphoric acid ester and polytetrafluoroethylene.

The content of the component (d) in the composition of the present invention is from 0.1 to 30 parts by mass per 100 parts by mass of the total content of the components (a) to (c). If the content of the flame retardant (d) is less than 0.1 part by mass, flame retardance of the fluorinated elastomer composition may be insufficient, and if it exceeds 30 parts by mass, the melt viscosity may increase, and the moldability may decrease.

A preferred range of the content of the flame retardant (d) may properly be set considering the type of the component (d) and the flame retardant properties.

For example, the content of antimony trioxide is preferably from 0.1 to 30 parts by mass, more preferably from 0.1 to 20 parts by mass, particularly preferably from 0.2 to 10 parts by mass per 100 parts by mass of the total content of the components (a) to (c).

In a case where the flame retardant (d) is a phosphoric acid ester, its content is preferably from 0.1 to 30 parts by mass, more preferably from 5 to 30 parts by mass, particularly preferably from 10 to 30 parts by mass per 100 parts by mass of the total content of the components (a) to (c).

The content of the anti-dripping agent such as PTFE is preferably from 0.1 to 10 parts by mass, more preferably from 0.1 to 2 parts by mass, particularly preferably from 0.1 to 1 part by mass per 100 parts by mass of the total content of the components (a) to (c). When it is at least the lower limit value of the above range, excellent flame retardance is readily obtainable, and when it is at most the upper limit value of the above range, the composition of the present invention has favorable flowability.

In a case where two or more types among such flame retardants are used in combination, the content of each flame retardant may be less than 0.1 part by mass so long as their total content is within a range of from 0.1 to 30 parts by mass per 100 parts by mass of the total content of the components (a) to (c). For example, in a case where an anti-dripping agent and another flame retardant are used in combination, the content of the anti-dripping agent is preferably at least 0.01 part by mass, more preferably 0.05 part by mass per 100 parts by mass of the total content of the components (a) to (c). When at least 0.01 part by mass of the anti-dripping agent is blended per 100 parts by mass of the total content of the components (a) to (c), the effect by the anti-dripping agent will sufficiently be obtained.

The composition of the present invention may contain a component other than the components (a) to (d) (hereinafter sometimes referred to as an optional component). However, a low molecular weight organic material easily burns and tends to lower the flame retardance of the fluorinated elastomer composition. Accordingly, the content of a low molecular weight organic material is preferably less than 5 parts by mass, more preferably less than 4 parts by mass per 100 parts by mass of the total content of the components (a) to (c) in the composition of the present invention. When it is less than 5 parts by mass per 100 parts by mass of the total content of the components (a) to (c), the effects by the component (d) will sufficiently be exhibited.

Here, in this specification, the "low molecular weight organic material" means an organic compound having a molecular weight of at most 1,000.

The optional component may, for example, be a cross-linking agent, a cross-linking aid, a filler, a stabilizer, a colorant, an antioxidant, a processing aid, a sliding agent, a lubricant, an antistatic agent, etc., and at least one of them may be incorporated as the case requires.

In a case where the composition of the present invention is to be cross-linked, among these additives, a cross-linking agent or a cross-linking aid is preferably incorporated.

As the cross-linking agent, any conventional one may be used, but an organic peroxide is preferred. As such an organic peroxide, one which is capable of easily generating radicals under heating or in the presence of a redox agent, may be used. The fluorinated elastomer composition cross-linked by using an organic peroxide is excellent in heat resistance.

Specific examples of the organic peroxide include 1,1-di (t-hexylperoxy)-3,5,5-trimethylcyclohexane, 2,5-dimethyl-hexane-2,5-dihydroperoxide, di-t-butyl peroxide, t-butyl-cumyl peroxide, dicumyl peroxide, α,α'-bis(t-butylperoxy)-p-diisopropylbenzene, 2,5-dimethyl-2,5-di(t-butylperoxy)-hexane, 2,5-dimethyl-2,5-di(t-butylperoxy)-hexyne-3, dibenzoyl peroxide, t-butyl peroxybenzene, 2,5-dimethyl-2,5-di(benzoylperoxy)hexane, t-butylperoxymaleic acid, t-hexylperoxyisopropyl monocarbonate, etc. Among them, α,α'-bis(t-butylperoxy)-p-diisopropylbenzene is preferred. These organic peroxides are excellent in cross-linking performance of the fluorinated elastomer composition.

The content of the organic peroxide is preferably from 0 to 4 parts by mass, more preferably from 0.2 to 3 parts by mass, most preferably from 0.5 to 3 parts by mass, per 100 parts by mass of the total content of the components (a) to (c) in the composition of the present invention. Within such a range, the cross-linking efficiency of the organic peroxide is high.

As the cross-linking aid, for example, triallyl cyanurate, triallyl isocyanurate, triacryl formal, triallyl trimellitate, dipropargyl terephthalate, diallyl phthalate, tetraallyl terephthalamide, triallyl phosphate, etc may be mentioned. Among them, triallyl isocyanurate is preferred. As the cross-linking aid, at least one type may be used.

In a case where the composition of the present invention contains a cross-linking aid, the content of the cross-linking aid is preferably from 0.1 to 4 parts by mass, more preferably from 0.5 to 4 parts by mass, further preferably from 1 to 4 parts by mass, per 100 parts by mass of the total content of the components (a) to (c). When the content of the cross-linking aid is at least the above lower limit value, the cross-linking rate is high, and a sufficient cross-linking degree is readily obtainable. When it is at most the above upper limit value, the properties such as elongation, etc., of a cross-linked product obtained by cross-linking of the composition of the present invention will be good.

As the filler, for example, carbon black, white carbon, clay, talc, calcium carbonate, glass fibers, carbon fibers, a fluororesin, etc may be mentioned.

As the carbon black, one commonly used as a filler for fluororubber may be employed without any particular restriction. Its specific examples include furnace black, acetylene black, thermal black, channel black, graphite, etc., and furnace black is preferred. As the furnace black, for example, HAF-LS, HAF, HAF-HS, FEF, GPF, APF, SRF-LM, SRF-HM, MT, etc. may be mentioned, and among them, MT carbon is more preferred. As the filler, at least one type may be used.

In a case where the composition of the present invention contains carbon black, the content of carbon black is preferably from 1 to 50 parts by mass, more preferably from 3 to 20 parts by mass, per 100 parts by mass of the total content of the components (a) to (c). When the content of carbon black is at least the lower limit value of the above range, the composition of the present invention will be excellent in strength, and it is possible to sufficiently obtain a reinforcing effect by blending carbon black. Further, when it is at most the upper limit value of the above range, the elongation will also be excellent. Thus, when the content of carbon black is within the above range, the balance of the strength and elongation will be good.

In a case where the composition of the present invention contains a filler other than carbon black, the content of such a filler is preferably from 5 to 200 parts by mass, more preferably from 10 to 100 parts by mass, per 100 parts by mass of the total content of the components (a) to (c).

Further, as the filler, carbon black and a filler other than carbon black may be used in combination. In a case where the composition of the present invention contains carbon black and a filler other than carbon black, their total content is preferably from 1 to 100 parts by mass, more preferably from 3 to 50 parts by mass, per 100 parts by mass of the total content of the components (a) to (c).

As the processing aid, for example, a higher fatty acid or an alkali metal salt of a higher fatty acid may be mentioned. Specifically, stearic acid, a stearic acid salt or a lauric acid salt is preferred. The content of the processing aid is preferably from 0.1 to 4 parts by mass, more preferably from 0.2 to 4 parts by mass, further preferably from 1 to 3 parts by mass, per 100 parts by mass of the total content of the components (a) to (c). As the processing aid, at least one type may be used.

(Properties of Fluorinated Elastomer Composition)

The melt flow rate (MFR) of the composition of the present invention is preferably from 4 to 50 g/10 min., more preferably from 5 to 40 g/10 min., most preferably from 6 to 30 g/10 min. When MFR is within such a range, the moldability and mechanical properties will be excellent.

The flexural modulus of the composition of the present invention is preferably from 10 to 600 MPa, more preferably from 50 to 400 MPa, most preferably from 70 to 300 MPa. The flexural modulus is a value which is an index for flexibility. The larger the flexural modulus, the lower the flexibility, and the smaller the flexural modulus, the higher the flexibility.

(Method for Producing Fluorinated Elastomer Composition)

The composition of the present invention is produced by kneading the above-described components (a) to (d) and optional components such as various additives to be incorporated as the case requires.

Here, the optional components may be added together with the components (a) to (d) in the step of kneading the components (a) to (d), or may be added after kneading the components (a) to (d).

Kneading of the components may be carried out by means of a known instrument having a kneading mechanism, such as an internal mixer, a single screw kneader, a twin-screw kneader, a single screw extruder, a twin-screw extruder or a multi-screw extruder. Among them, it is preferred to carry out kneading by means of an extruder such as a twin-screw extruder or a multi-screw extruder.

The kneading of the components is preferably melt-kneading which is carried out under heating at a temperature of from 250 to 320° C. The heating temperature is more preferably from 255 to 310° C., further preferably from 260 to 300° C. When the kneading temperature is within such a range, the ratio in melt-viscosity of the component (a) and the component (b) becomes close to 1, a fluorinated elastomer composition excellent in dispersibility is obtainable, and the molded product obtainable therefrom will be excellent in surface smoothness.

As the apparatus to be used for melt-kneading, a twin-screw extruder, or a single screw extruder equipped with a screw having a high kneading efficiency, is preferred, a twin-screw extruder is more preferred, and a twin-screw extruder equipped with screws having a high kneading efficiency is most preferred. As a screw having a high kneading efficiency, it is more preferred to select one which has an adequate kneading efficiency for the composition and which presents no excessive shearing force.

The shear speed is preferably set depending upon the melt-viscosity of the composition within the above-mentioned temperature range.

The rotational speed of the screw of the extruder in the melt-kneading is preferably from 50 to 1,000 rpm, more preferably from 100 to 500 rpm. If the screw rotational speed is too low, the dispersibility of the composition obtainable by shearing may sometimes be low, and if it is too high, the molecular chains of the copolymers are likely to be cut, whereby elongation of the obtainable composition tends to be low. When the screw rotational speed is within such a range, the compatibilizing reaction properly proceeds, and the balance of the strength and elongation will be good.

The progress of compatibilization may be controlled by adjusting parameters such as the kneading time, kneading temperature, shearing speed, etc. Especially when the shearing speed condition is adjusted so as to minimize the difference in melt-viscosity between the component (b) and the component (c), the dispersed particles of the component (b) will be further reduced in their size.

The melt-kneading is conducted until the viscosity of the composition becomes constant. The change in viscosity during the melt-kneading of the composition may be inspected by a change with time of the rotational torque by a torque meter via the screw. Here, "until the viscosity of the composition becomes constant" means that the melt-kneading is conducted until such a state that the change in the rotational torque value is within 5% from the center value for at least a predetermined time.

The time required for the melt-kneading may vary depending upon the temperature for the melt-kneading, the blend composition of the composition or the shape of the screw, but, from the viewpoint of the economical efficiency and productivity, it is preferably from 1 to 30 minutes, more preferably from 1 to 20 minutes, most preferably from 2 to 10 minutes.

For example, in a case where the component (a) having a melt viscosity of 2.3 kPa·s and the component (b) having a melt viscosity of 2.4 kPa·s are to be melt-kneaded in a mass ratio of 50/50 at 270° C., in the case of using a capillary rheometer (manufactured by Toyo Seiki Seisaku-sho, Ltd.), the time for melt-kneading is preferably from 2 to 7 minutes. Further, in the case of using a twin screw extruder, a retention time of from 1 to 5 minutes is preferred. The retention time may be set by preliminarily measuring the change with time of the viscosity by means of a batch-type twin screw kneader such as Laboplasto Mill (manufactured by Toyo Seiki Seisaku-sho, Ltd.) and based on such data of the change with time.

The form of the component (b) to be used for the melt-kneading is preferably a powder. As such a powder, one with a small particle size is more preferred. When the particle size is small, kneading becomes easy at the time of conducting the melt-kneading, and besides, a uniform melt-kneaded state is readily obtainable. Particularly, as such a powder, a powder obtained by drying an ETFE slurry obtained by solution polymerization is preferred.

Further, the form of the component (a) is preferably crumbs. It is particularly preferred to use crumbs of a TFE/P copolymer obtained by coagulating a latex of TFE/P copolymer obtained by emulsion polymerization, by drying the crumbs.

It is also preferred that before the melt-kneading, the crumbs of the TFE/P copolymer and the powder of ETFE are mixed without heating, by means of a conventional apparatus. Further, it is also preferred to mix the two copolymers in the extruder at the time of melt-kneading.

(Function and Effects)

The composition of the present invention, which contains the component (d), has excellent flame retardance.

Further, the composition of the present invention is excellent also in flexibility and heat resistance. When the component (d) is contained, flexibility and heat resistance, particularly heat resistance tends to be lowered as compared with a case where it is not contained, however, according to the present invention, flexibility and heat resistance equal to or higher than the case containing no component (d) may be achieved.

Further, the composition of the present invention is also superior in the moldability. Heretofore, if ETFE is blended with a TFE/P copolymer, moldability tends to be insufficient, and if such a composition is used as a covering material for an electric wire, defects due to failure in formation such as weld lines may occur in some cases. According to the composition of the present invention, such defects hardly occur.

The above effect is considered to be because of an increased compatibility between the components (a) and (b) by the component (c).

That is, a problem of dispersion failure is likely to arise only by two components i.e. the components (a) and (b). This is considered to be because they are incompatible, and when only such two components are kneaded, even if they are kneaded under heating (melt-kneading), dispersion may be locally insufficient.

In the present invention, by incorporating the component (c), compatibility between the components (a) and (b) increases, and dispersion failure is less likely to occur when these components are kneaded. Particularly in a case where the mass ratio of the components (a) to the component (b) is from 55/45 to 45/55, the two copolymers may sometimes form a continuous phase. It is considered that when such a morphology is fixed, the flexibility and heat resistance of the fluorinated elastomer composition can be maintained. Further, it is considered that by such fixing of the morphology, dispersion failure may be prevented, and it is possible to obtain a molded product excellent in mechanical properties such as elongation, etc.

<Molded Product and Cross-Linked Product>

The molded product of the present invention is a molded product obtained by molding the fluorinated elastomer composition of the present invention. The molding method may, for example, be injection molding, extrusion molding, coextrusion molding, blow molding, compression molding, inflation molding, transfer molding or calendar molding.

The fluorinated elastomer composition of the present invention has a melt viscosity lower than the component (a) as a raw material, and thus, is excellent in molding processability, as the withdrawing speed may be set to be high.

The cross-linked product of the present invention is one obtained by cross-linking the fluorinated elastomer composition of the present invention. The cross-linking is carried out at the same time as molding, or after molding.

The molded product or the cross-linked product of the present invention may, for example, be made to be an electrical insulating material such as a covering material for e.g. electrical components. As specific applications, in addition to a coating material in the after-described covered electric wire, a sheath material for protecting an electric wire, an insulating covering material and sheath material for cables, etc. may be mentioned.

Further, the cross-linked product may be made to be a cylindrical product such as a hose, tube, etc. Such a cylindrical product may be produced by extrusion-molding the fluorinated elastomer composition into a cylindrical shape, followed by cross-linking.

In order to impart low friction properties or water repellency to the molded product, it is also preferred to moderately roughen the surface of the molded product to form irregularities. The height of the protrusions is preferably at most 5 μm by the average roughness Ra in accordance with JIS B0601. The cross-linked product of the present invention may also be made to be various components to be used in various industrial fields such as the automobile field, the industrial robot field, the heating equipment field, such as gaskets, packing, diaphragms, etc.

The cross-linking method for obtaining the cross-linked product is not particularly limited. For example, it may be a chemical cross-linking method using as a cross-linking agent an organic peroxide such as α,α'-bis(t-butylperoxy)-p-diisopropylbenzene or dicumyl peroxide, or an irradiation cross-linking method using an ionizing radiation such as X-rays, γ-rays, electron beams, proton beams, heavy proton beams, α-rays or β-rays.

In an application to a covering material for an electric component such as an electric wire, an electron beam cross-linking using electron beams as the ionizing radiation, is preferred, and in an application to a cylindrical product such as a hose, tube, etc., a chemical cross-linking method using an organic peroxide, is preferred.

<Covered Electric Wire>

The covered electric wire of the present invention is one comprising a conductor and a covering material for covering the conductor, wherein the covering material is the fluorinated elastomer composition or the cross linked product of the present invention.

The conductor is not particularly limited and may, for example, be copper, a copper alloy, aluminum, an aluminum alloy, various plated wires such as tin-plated, silver-plated and nickel-plated wires, a stranded wire, a super conductive conductor, a plated wire for semiconductor element lead, etc.

The covered electric wire wherein the covering material is the fluorinated elastomer composition of the present invention may be produced by covering a conductor with the fluorinated elastomer composition of the present invention. Covering of the conductor with the fluorinated elastomer composition may be carried out by a known method.

The covered electric wire wherein the covering material is the cross-linked product of the present invention may be produced by irradiating with electron beams a covered electric wire having a conductor covered with the fluorinated elastomer composition of the present invention to cross-link the fluorinated elastomer composition.

The irradiation dose of electron beams is preferably from 50 to 700 kGy, more preferably from 80 to 400 kGy, most preferably from 100 to 250 kGy. The temperature at the time of irradiation with electron beams is preferably from 0 to 300° C., more preferably from 10 to 200° C., most preferably from 20 to 100° C.

The fluorinated elastomer composition of the present invention has a melt viscosity lower than the component (a) as a raw material, and thus is excellent in molding processability, as the withdrawing speed may be set to be high. Accordingly, the covered electric wire of the present invention can be produced at a high speed.

Further, it contains the component (a), whereby, as compared with a covered electric wire obtained by using the thermoplastic component (b) only, it can be used continuously at a high temperature, and it is excellent also in flexibility and thus is suitable for application to e.g. a covered electric wire for automobiles, which is required for wiring to conserve space.

EXAMPLES

Now, the present invention will be described specifically with reference to Examples and Comparative Examples. Materials used in each Example are as follows.

<Materials Used>
[Component (a)]

"AFLAS 150C" manufactured by Asahi Glass Company, Limited, being a TFE/P bipolymer, was used.

Of the above copolymer, the molar ratio (TFE/P) of units derived from TFE to units derived from P, was 56/44; the fluorine content was 57 mass %; the Mooney viscosity $ML_{1+10}$ (121° C.) was 120; the glass transition temperature (Tg) was −3° C.; and the melting point (Tm) was nil.

[Component (b)]

"Fluon LM-730AP" manufactured by Asahi Glass Company, Limited, being an E/TFE/(perfluorobutyl)ethylene terpolymer, was used.

Of the above copolymer, the molar ratio (E/TFE/(perfluorobutyl)ethylene) of units derived from E, units derived from TFE and units derived from (perfluorobutyl)ethylene, was 40/57/3; MFR was 25 g/10 min.; Tg was 75° C.; and Tm was 225° C.

[Component (c)]

"Bond Fast 7M" manufactured by Sumitomo Chemical Co., Ltd., being an ethylene/methyl acrylate/glycidyl methacrylate copolymer, was used.

Of the above copolymer, the content of units derived from E was 67 mol %; the content of units derived from methyl acrylate was 27 mol %; the content of units derived from glycidyl methacrylate was 6 mol %; MFR was 7 g/10 min.; Tg was −33° C.; and Tm was 52° C.

[Component (d)-1]

"Fire Cut AT3" manufactured by SUZUHIRO CHEMICAL CO., LTD., being antimony trioxide, was used.

The above compound is a white powder having a melting point of 656° C., a boiling point of 1,425° C. and a specific gravity of 5.2.

[Component (d)-2]

"PX-200" manufactured by DAIHACHI CHEMICAL INDUSTRY CO., LTD, being 1,3-phenylenebis(di2,6-xylenyl phosphate) which is an aromatic condensed phosphate, was used.

The above compound is a white powder having an acid value of 1.0 (KOHmg/g) and a phosphorus atom content of 9.0 mass %.

[Component (d)-3]

"Fluon PTFE CD097E" manufactured by Asahi Glass Company, Limited, being polytetrafluoroethylene, was used.

The above compound has a bulk density of 500 g/L, an average particle size of 500 μm and a specific gravity of 2.18.

[Component (d)-4]

"SPS-100" manufactured by manufactured by Otsuka Chemical Co., Ltd., being cyclophenoxyphosphazene, which is one type of phosphazene compound, was used.

[Component (d)-5]

"PHOSMEL-200" manufactured by Nissan Chemical Industries, Ltd., being Melamine-melam-melem salt of a polyphosphoric acid, was used. It has a phosphorus content of from 9 to 12% and a bulk specific density of from 0.1 to 0.3 g/m L.

[Component (d)-6]

"NA-1070L" manufactured by Nissan Chemical Industries, Ltd., being sodium antimonite, was used. It has an average particle size of from 3.5 to 5.5 μm and a bulk specific density of from 0.57 to 0.87 g/mL.

[Component (d)-7]

"NA-1030" manufactured by Nissan Chemical Industries, Ltd., being antimony pentoxide, was used. It has an average particle size of from 3 to 5 μm and a bulk specific density of from 0.5 to 0.8 g/mL.

Examples 1 to 8 and Comparative Examples 1 to 2

By means of an internal mixer, the above-mentioned respective materials were sufficiently kneaded (melt-kneaded) in the blend ratios (mass-based) shown in Table 1 to obtain a fluorinated elastomer composition in each Example. The kneading temperature and time were 250° C.×6 minutes, and the rotor rotational speed was 50 rpm.

[Preparation of Sample]

The obtained fluorinated elastomer composition was press-molded under conditions of 250° C.×15 min and 10 MPa to obtain a sheet-shape sample having a thickness of about 1 mm in each Example.

Of the prepared sample, the flammability, the normal state physical properties and the heat ageing resistance were evaluated in accordance with the following procedure. The results are shown in Table 1.

[Evaluation of Flammability]

The flammability of each sample was confirmed in accordance with UL94V, standard for flammability. Conditioning was carried out at 23±2° C. under a humidity of 50±5% RH for 48 hours, and the test specimens were sheets of 125 mm×13 mm×1 mm in thickness. The test was carried out at a temperature of 23° C. under a humidity of 56% RH. The ratings were as follows.

V-0: No sample may not burn for more than 10 seconds after each application of the test flame. The total flaming combustion time may not exceed 50 seconds for 10 flame applications for 5 specimens. No specimen may burn up to the holding clamp. No specimen may drip flaming particles that ignite the dry absorbent surgical cotton located below the test specimen. No specimen may have glowing combustion that persists for more than 30 seconds after the second application of the test flame.

V-1: No specimen may burn for more than 30 seconds after each application of the test flame. The total flaming combustion time may not exceed 250 seconds for the 10 flame applications for 5 specimens. No specimen may burn up to the holding clamp. No specimen may drip flaming particles that ignite the dry absorbent surgical cotton located below the test specimen. No specimen may have glowing combustion that persists for more than 60 seconds after the second application of the test flame.

V-2: No specimen may burn for more than 30 seconds after each application of the test flame. The total flaming combustion time may not exceeds 250 seconds for the 10 flame applications for 5 specimens. No specimen may burn up to the holding clamp. The specimens can drip flaming particles that ignite the dry absorbent surgical cotton located below the test specimen. No specimen may have glowing combustion that persists for more than 60 seconds after the second application of the test flame.

[Evaluation of Normal State Physical Properties and Heat Ageing Resistance]

With respect to each sample, the normal state physical properties (initial tensile strength and tensile elongation) and heat ageing resistance (retention of strength and retention of elongation) were evaluated in accordance with JIS K6251: 1999 and JIS K6257: 2010 for Table 1 and in accordance with ASTM D638-V and JIS K6257: 2010 for Table 2.

Here, the retention of strength for heat ageing resistance is the proportion of the tensile strength after being left at 200° C. for 96 hours, to the initial tensile strength, and the retention of elongation for heat ageing resistance is the proportion of the tensile elongation after being left at 200° C. for 96 hours, to the initial tensile elongation.

TABLE 1

|  | Items | Ex. 1 | Ex. 2 | Ex. 3 | Ex. 4 | Comp. Ex. 1 |
|---|---|---|---|---|---|---|
| Blend ratios | Component (a) | 49 | 49 | 49 | 49 | 49 |
|  | Component (b) | 50 | 50 | 50 | 50 | 50 |
|  | Component (c) | 1 | 1 | 1 | 1 | 1 |
|  | Component (d-1) | 1 | 1 | — | — | — |
|  | Component (d-2) | — | — | 1 | 12.5 | — |
|  | Component (d-3) | — | 0.5 | 0.5 | — | — |
| Flammability | UL94 | V-0 | V-0 | V-1 | V-0 | V-2 |
| Initial | Tensile strength (MPa) | 6.0 | 6.3 | 7.3 | 6.8 | 6.0 |
|  | Tensile elongation (%) | 350.0 | 380.0 | 380.0 | 370.0 | 498.0 |
| Heat ageing resistance | Retention of strength (%) | 120.7 | 120.6 | 101.8 | 110.8 | 159.1 |
|  | Retention of elongation (%) | 94.9 | 139.2 | 119.5 | 109.5 | 91.2 |

TABLE 2

|  | Items | Ex. 5 | Ex. 6 | Ex. 7 | Ex. 8 | Comp. Ex. 2 |
|---|---|---|---|---|---|---|
| Blend ratios | Component (a) | 49 | 49 | 49 | 49 | 49 |
|  | Component (b) | 50 | 50 | 50 | 50 | 50 |
|  | Component (c) | 1 | 1 | 1 | 1 | 1 |
|  | Component (d-3) | 0.5 | 0.5 | 0.5 | 0.5 | — |
|  | Component (d-4) | 5 | — | — | — | — |
|  | Component (d-5) | — | 5 | — | — | — |
|  | Component (d-6) | — | — | 3 | — | — |
|  | Component (d-7) | — | — | — | 1 | — |
| Flammability | UL94 | V-0 | V-0 | V-0 | V-0 | V-2 |
| Initial | Tensile strength (MPa) | 11.3 | 11.7 | 15.0 | 14.3 | 15.0 |
|  | Tensile elongation (%) | 202 | 289 | 351 | 337 | 429 |
| Heat ageing resistance | Retention of strength (%) | 126.3 | 104.3 | 93.5 | 107.7 | 86.7 |
|  | Retention of elongation (%) | 136.8 | 121.2 | 117.5 | 105.2 | 116.3 |

As shown in Tables 1 and 2, in Examples 1 to 8, the rating for UL94, the standard for flammability, was V-0 or V-1, and the specimens have excellent flame retardance. Whereas in Comparative Examples 1 and 2 in which no component (d) was contained, the rating was V-2, and the specimens were inferior in the flame retardance to Examples 1 to 8.

Further, in Examples 1 to 8, the initial tensile elongation was sufficiently large, there was no decrease in the tensile strength, and the sample had excellent flexibility. The results were substantially equal to those in Comparative Examples 1 and 2 in which no component (d) was contained, and substantially no deterioration of flexibility by incorporation of the component (d) was observed.

Further, in Examples 1 to 8, the retention of strength after being left at 200° C. for 96 hours was almost 100%, and deterioration of the tensile strength was suppressed as compared with Comparative Examples 1 and 2. Further, no remarkable deterioration of the retention of elongation was observed.

From the above results, excellent heat resistance in Examples 1 to 8 was confirmed.

INDUSTRIAL APPLICABILITY

The fluorinated elastomer composition of the present invention is excellent in flexibility, heat resistance and flame retardance.

Further, the molded product, cross-linked product or covered electric wire of the present invention is excellent in flexibility, heat resistance and flame retardance.

Accordingly, the fluorinated elastomer composition, molded product or cross-linked product of the present invention is suitable for use as an insulation covering material or sheath material for electric wires or cables to be used in various fields including automobiles, industrial robots, heating instruments, etc. Further, by utilizing its excellent characteristics, it is useful also for hoses, gaskets, packing, diaphragms, tubes, etc., in the fields of automobile components, industrial robots, industrial products, etc.

This application is a continuation of PCT Application No. PCT/JP2014/073575, filed on Sep. 5, 2014, which is based upon and claims the benefit of priority from Japanese Patent Application No. 2013-198249 filed on Sep. 25, 2013 and Japanese Patent Application No. 2013-246415 filed on Nov. 28, 2013. The contents of those applications are incorporated herein by reference in their entireties.

What is claimed is:

1. A fluorinated elastomer composition comprising a tetrafluoroethylene/propylene copolymer (a), an ethylene/tetrafluoroethylene copolymer (b), an ethylene copolymer (c) containing epoxy groups and a flame retardant (d), wherein
the mass ratio [(a)/(b)] of the tetrafluoroethylene/propylene copolymer (a) to the ethylene/tetrafluoroethylene copolymer (b) is from 70/30 to 40/60,
the mass ratio [(b)/(c)] of the ethylene/tetrafluoroethylene copolymer (b) to the ethylene copolymer (c) containing epoxy groups is from 100/0.1 to 100/10, and
the content of the flame retardant (d) is from 0.1 to 30 parts by mass per 100 parts by mass of the total content of the tetrafluoroethylene/propylene copolymer (a), the ethylene/tetrafluoroethylene copolymer (b) and the ethylene copolymer (c) containing epoxy groups.

2. The fluorinated elastomer composition according to claim 1, wherein the flame retardant (d) is at least one member selected from the group consisting of antimony trioxide, a phosphoric acid ester and polytetrafluoroethylene.

3. The fluorinated elastomer composition according to claim 1, wherein the tetrafluoroethylene/propylene copolymer (a) is a copolymer comprising from 35 to 70 mol % of units derived from tetrafluoroethylene, from 25 to 55 mol % of units derived from propylene, and from 0 to 40 mol % of units derived from other monomer, and
the ethylene/tetrafluoroethylene copolymer (b) is a copolymer comprising from 45 to 70 mol % of units derived from tetrafluoroethylene, from 30 to 55 mol % of units derived from ethylene, and from 0 to 10 mol % of units derived from other monomer.

4. The fluorinated elastomer composition according to claim 1, wherein the ethylene copolymer (c) containing epoxy groups is at least one member selected from the group consisting of an ethylene/glycidyl methacrylate copolymer, an ethylene/glycidyl methacrylate/vinyl acetate copolymer, an ethylene/methyl acrylate/glycidyl methacrylate copolymer and an ethylene/ethyl acrylate/glycidyl methacrylate copolymer.

5. The fluorinated elastomer composition according to claim 1, which has a melt flow rate of from 4 to 50 g/10 min. as measured at a temperature of 297° C. under a load of 49N.

6. A method for producing the fluorinated elastomer composition as defined in claim 1, which comprises a step of kneading the tetrafluoroethylene/propylene copolymer (a), the ethylene/tetrafluoroethylene copolymer (b), the ethylene copolymer (c) containing epoxy groups and the flame retardant (d) under a heating condition of from 250 to 320° C.

7. A molded product obtained by molding the fluorinated elastomer composition as defined in claim 1.

8. A cross-linked product obtained by cross-linking the fluorinated elastomer composition as defined in claim 1.

9. A covered electric wire comprising a conductor and a covering material for covering the conductor, wherein the covering material is the fluorinated elastomer composition as defined in claim 1.

10. A covered electric wire comprising a conductor and a covering material for covering the conductor, wherein the covering material is the cross-linked product as defined in claim 8.

* * * * *